United States Patent Office 3,115,469
Patented Dec. 24, 1963

3,115,469
PRODUCTION OF SINGLE CRYSTALS
OF FERRITES
Paul M. Hamilton, Dayton, Ohio, assignor to Monsanto Chemical Company, St. Louis, Mo., a corporation of Delaware
No Drawing. Filed June 22, 1959, Ser. No. 821,633
1 Claim. (Cl. 252—62.5)

The present invention relates to a new method for the production of single crystal ferrites. It is an object of this invention to provide a new and economical method for the production of barium, strontium, lead, nickel, cobalt, copper, zinc, manganese, magnesium and cadmium ferrites as well as mixed ferrites such as nickel zinc ferrite and manganese zinc ferrite. It is a further object to provide a new method for the production of single crystal forms of ferrites by the use of a molten matrix in which the chemical reaction occurs for the production of the said ferrites. Further objects and advanges of the invention will be apparent from the following description.

The present process for the production of single crystal forms of ferrites is based upon a chemical reaction which occurs in a molten inorganic matrix. The term "single crystal" as employed herein, refers to a crystalline ferrite material in which the ultimate particle is composed completely of one crystal only in contrast to polycrystalline particles.

Essentially the present process for the production of a single crystal form of a metal ferrite selected from the group consisting of barium, strontium, lead, nickel, cobalt, copper, zinc, manganese, magnesium and cadmium ferrites comprises dissolving an iron component selected from the group consisting of iron oxides, carbonates, halides and nitrates together with another metal component selected from the group consisting of the oxides, carbonates, halides and nitrates of barium, strontium, lead, nickel, cobalt, copper, zinc, manganese, magnesium and cadmium in a molten inorganic matrix selected from the group consisting of the halides and nitrates of barium, strontium, lead, nickel, cobalt, copper, zinc, manganese, magnesium, cadmium, sodium, potassium and calcium, cooling the said matrix to solidification, and isolating the ferrite therefrom.

In addition to single members of each group, combinations are equally well employed with regard to components of the ferrites and with regard to the matrix. For example, a lead barium ferrite is obtained by charging lead nitrate and an iron oxide to a matrix of sodium chloride and barium oxide.

When mixed ferrites such as nickel zinc ferrite or manganese zinc ferrite are desired, the corresponding metallic components may be introduced as the said oxides, carbonates, halides or nitrates.

In the production of ferrites, the starting metallic components may already exist in the desired oxide state whereupon the said individual metal oxides react in the inorganic matrix. However when the metallic components are introduced as salts, e.g. ferrous chloride and barium chloride or other halides, it is necessary to oxidize the metallic components to the desired ferrite combination. This is accomplished by air oxidation e.g. at the exposed surface of the molten mixture, or by blowing air or oxygen through the mixture.

The proportions of the barium, strontium, or lead together with the iron may be varied over a wide range of proportions, since it has been found that the present method yields stoichiometric ferrites, for example $BaO \cdot 6Fe_2O_3$ regardless of the ratio of the barium and of the iron which is present in dissolved or undissolved form in the salt matrix. In order to obtain the desired ferrite of barium, strontium, lead, nickel, cobalt, copper, zinc, manganese, magnesium and cadmium the components are melted, after which the molten matrix is maintained at the desired temperature for a time sufficient to grow the desired size of single crystals. The temperature which is employed may vary broadly in the range from the melting point to the boiling point of the desired compounds, a preferred temperature range being from 1,100° C. to 1,350° C. However still more preferred temperature range for the production of a ferrite such as barium ferrite in a chloride melt, such as barium chloride, is from 1,200° C. to 1,300° C., while a preferred temperature range for the production of barium ferrite in a nitrate melt such as barium nitrate is from 1,000° C. to 1,200° C.

In general, oxide components may be introduced as such, or as precursor compounds which yield oxides, e.g. organic compounds such as oxalates, acetates, naphthenates and acetyl acetonates.

The molten matrix after having been held at the desired temperature may be cooled very slowly or may be rapidly quenched, particularly employing quenching when single crystals of small sizes are desired. The proportion of the matrix by weight relative to the ferrite product may also be varied over a wide range such as from 100:1 to 1:1. Inasmuch as the ferrite of barium, strontium, lead, nickel, cobalt, copper, zinc, manganese, magnesium and cadmium, produced in the process of the present invention is insoluble in water, whereas the salt components are readily soluble in water, the isolation of the ferrite is simply accomplished by subjecting the solidified reaction mixture to water extraction which results in the dissolving away of the salt matrix and the separation of the desired ferrite. The solution of the salt matrix thus recovered may be subjected to a recovery treatment for example by the use of evaporation and crystallization in order to recover the salt matrix component for subsequent reuse.

The product obtained in the practice of the present invention is characterized as having a single crystal structure as evidenced by optical and X-ray measurements. The particle size of the single crystals may vary from 0.2 micron to 15 microns as representative of the smaller single crystals. However, larger single crystals having sizes up to 2,000 and 3,000 microns are also obtained by the use of longer growth periods and the use of a slow cooling rate of the reaction mixture.

It has been found that some of the products obtained in the practice of the present invention are transparent particularly to the shorter wave lengths of the visible band. This makes the single crystals of the present invention of utility in a number of relationships.

Thus the products of the present invention may be used as optical windows in scientific apparatus.

The single crystals produced in the practice of the present invention are also characterized as having unusual properties as lubricants. In this relationship the material produced by the above method may be dispersed in oil or another conventional lubricating medium in order to provide a high temperature lubricant. Thus the present ferrites may be used similarly to graphite, but with the advantage that they are not subject to oxidation and therefore can be used in oxidizing atmospheres and other locations in which graphite suffers the disadvantage of being adversely affected by oxidation.

Another field of use for the present single crystal forms of ferrites is as a magnetic material suitable for use in magnetic clutches. In this relationship the ferrites such as barium ferrite are dispersed in a mineral oil which is contained within a clutch. When this apparatus is subjected to a magnetic field, the ferrite particles align themselves and provide a means of magnetically gripping the clutch members.

The present invention also contemplates the production of soft ferrites in a molten inorganic medium. The cations which are employed for this purpose to be reacted with an iron source include barium, strontium, lead, nickel, cobalt, copper, zinc, manganese, magnesium and cadmium. These may be introduced as the halides, oxides (including precursors such as oxalates) carbonates or nitrates. The said components are dissolved in the salt medium together with an iron source, such as iron oxide or the halides, carbonates or nitrates for reaction to form the desired ferrite.

The following examples illustrate specific embodiments of the present invention:

*Example 1*

A charge mixture was prepared using one mole of barioxide, 6 moles of iron oxide which were mixed with 500 weight percent of barium chloride referred to the weight of the two components described above. The mixture was heated in a crucible to a temperature of 1,250° C. for a period of ½ hour, after which the entire mixture was slowly cooled. The reaction mixture was then extracted in water in order to isolate the barium ferrite ($BaO \cdot 6Fe_2O_3$) product. The ferrite thus obtained had a light red color for the individual single crystals which had an average diameter of about 15 microns.

*Example 2*

The method of Example 1 was repeated utilizing several tests in which the proportions of barium chloride were 500%, 100% and 20% by weight of the barium chloride medium relative to oxides. It was found that the product obtained in each case was substantially the same as in Example 1.

*Example 3*

A series of temperature studies was carried out utilizing the procedure of Example 1, but with temperatures of 1,200° C., 1,250° C., 1,300° C. and 1,350° C. It was found that the highest value of repulsive force of the product was obtained for the sample which had been heated at 1,300° C. for a half hour under molten conditions. The data obtained in this test in comparison to a sample of heat treated barium ferrite of a commercial variety is shown below. The repulsive force was measured by an arbitrary test in which the specific repulsion was measured in grams.

| Sample: | Specific Repulsion |
|---|---|
| Single crystals from barium chloride melt (barium carbonate charged for the barium source at 1,300° C., ½ hour reaction time) | 6.30 |
| Heat treated commercial barium ferrite (1,250° C.) | 4.56 |

The above data indicate that a superior product is obtained by the practice of the present invention in comparison to a simple heat treating of conventional barium ferrite.

*Example 4*

The preparation of nickel zinc ferrite was carried out by charging one mole of nickel nitrate, one mole of zinc nitrate and one mole of ferric oxide with 10 moles of sodium chloride. The powdered mixture was heated in a crucible to a temperature of 1,200° C. for a period of ½ hour, after which the entire mixture was slowly cooled. The reaction mixture was then extracted in water in order to remove the sodium chloride and to isolate the insoluble product, nickel zinc ferrite. The ferrite thus obtained had a light grey color for the individual particles existing as single crystals.

*Example 5*

The preparation of manganese zinc ferrite was carried out by making a charge mixture of 1 mole of manganese dioxide, one mole of zinc oxide, and 1 mole of ferrous nitrate. The aforesaid components were mixed with 10 moles of potassium chloride as the reaction medium. The mixture was melted in a crucible and maintained in the molten condition at 1,150° C. for a period of 2 hours. The mixture was then quenched by pouring into water, after which the potassium chloride was removed by water extraction, leaving as an insoluble residue a powder existing in the form of single crystals of manganese zinc ferrite.

What is claimed is:

Process for the production of a single crystal form of barium ferrite which comprises dissolving an iron oxide in a barium chloride matrix maintained under molten conditions, cooling the said melt to solidification and isolating barium ferrite therefrom.

References Cited in the file of this patent

UNITED STATES PATENTS

| 1,821,208 | Dahlberg | Sept. 1, 1931 |
| 2,370,443 | Biefeld | Feb. 27, 1945 |
| 2,736,708 | Crowley et al. | Feb. 29, 1956 |
| 2,848,310 | Remeika | Aug. 19, 1958 |
| 2,858,199 | Larsen | Oct. 28, 1958 |
| 2,893,830 | Brixner | July 7, 1959 |
| 2,935,411 | Robinson | May 3, 1960 |

FOREIGN PATENTS

| 774,270 | Great Britain | May 8, 1957 |

OTHER REFERENCES

Bauer: J. Amer. Ceramic Soc., vol. 33, pp. 140–143.